United States Patent
Denteneer et al.

(10) Patent No.: US 8,837,383 B2
(45) Date of Patent: Sep. 16, 2014

(54) METHOD OF GENERATING REPORT MESSAGES IN A NETWORK

(75) Inventors: Theodorus Jacobus Johannes Denteneer, Eindhoven (NL); Guido Roland Hiertz, Aachen (DE); Bernard Walke, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 764 days.

(21) Appl. No.: 12/668,039

(22) PCT Filed: Jul. 10, 2008

(86) PCT No.: PCT/IB2008/052774
§ 371 (c)(1),
(2), (4) Date: Jan. 7, 2010

(87) PCT Pub. No.: WO2009/010903
PCT Pub. Date: Jan. 22, 2009

(65) Prior Publication Data
US 2010/0195593 A1    Aug. 5, 2010

(30) Foreign Application Priority Data
Jul. 18, 2007 (EP) ..................... 07301250

(51) Int. Cl.
*H04W 4/00* (2009.01)
*H04W 48/08* (2009.01)
*H04W 72/04* (2009.01)
*H04W 28/26* (2009.01)

(52) U.S. Cl.
CPC .............. *H04W 48/08* (2013.01); *H04W 72/04* (2013.01); *H04W 28/26* (2013.01)
USPC ......................................... 370/329; 455/434

(58) Field of Classification Search
CPC ..................................................... H04W 72/04
USPC ................... 370/329–331, 312; 455/434, 436
See application file for complete search history.

(56) References Cited

U.S. PATENT DOCUMENTS

| | | | |
|---|---|---|---|
| 7,746,879 B2 * | 6/2010 | Kangude et al. | 370/406 |
| 2005/0063330 A1 * | 3/2005 | Lee et al. | 370/328 |
| 2005/0089005 A1 * | 4/2005 | Sakoda et al. | 370/348 |

FOREIGN PATENT DOCUMENTS

| | | | |
|---|---|---|---|
| WO | 02089416 A2 | | 11/2002 |
| WO | WO02089416 | * | 11/2002 |
| WO | 2005076544 A1 | | 8/2005 |

OTHER PUBLICATIONS

Hiertz et al: "Mesh Networks Alliance (MNA) Proposal IEEE 802.11s-MAC Sublayer Functional Description IEEE.11s-Mesh WLAN Security"; Internet Citation, Retrieved From :HTTP://WWW.IEEE802.ORG/11/docFiles/05/11-05-0605-02-000s-mesh-networks.alliance-proposal.doc>; Retrieved on Sep. 28, 2006.

* cited by examiner

*Primary Examiner* — Afshawn Towfighi
(74) *Attorney, Agent, or Firm* — Larry Liberchuk (57) ABSTRACT

The present invention relates to a method of generating a message by a station in a network in which stations 5 transmit by intervals (A) for reporting to other stations (B) of reservations of a medium in an interval, wherein the station: —generates a set (10) of reservation information elements (A.1-A.n) wherein each reservation information element (A.1-A.n) identifies one of said reservations in the interval; and —creates at least one message (21-24) containing reservation information elements (A.1-A.n); —transmits the message to other stations (B).

11 Claims, 5 Drawing Sheets

METHOD OF GENERATING REPORT MESSAGES IN A NETWORK

FIELD OF THE INVENTION

The present invention relates to a method for reporting reservation of a medium in a network, the network comprising stations transmitting by intervals, e.g. of time.

The invention may be particularly relevant for wireless networks, in particular mesh wireless networks, such as WLAN (Wireless Local Area Network) based on the IEEE 802.11 standard, and in particular on the next IEEE 802.11s standard—currently drafted.

BACKGROUND OF THE INVENTION

In communication systems, and especially in wireless systems, transmissions are vulnerable to interference. Thus, simultaneous transmitted frames can collide and corrupt each other. These systems usually take a number of precautions in order to reduce the number of collisions. Examples from the well known IEEE 802.11 standard include Carrier Sense Multiple Access with Collision Avoidance (CSMA/CA) and the Request to Send/Clear to Send (RTS/CTS) virtual carrier sense protocols. Reference is made to the IEEE 802.11 standard for details on actions and protocols followed by stations for either of these two protocols.

It is well known that the medium access problems are aggravated in scenarios where the radio node density is high, and where there are many hidden nodes. A prime example where this is likely to happen and to cause severe problems is in mesh networks.

The IEEE 802.11s standardization committee group is currently working on an extension of the 802.11 standard for meshes. The current IEEE 802.11s standard specification, version D1.05, incorporated herein by reference, defines an IEEE 802.11 WLAN Mesh using IEEE MAC/PHY layers. Mesh networks according to the 802.11s standard, or so-called meshes, operate as wireless co-operative communication infrastructures between numerous individual wireless transceivers. Stations or mesh points (MP) in the network communicate with their neighbouring adjacent MPs only and thus act as repeaters to transmit message data from nearby nodes to peer that are too far to reach. Terminology of the 802.11s standard will be used in the following paragraphs to illustrate the invention.

In such mesh networks, MPs usually transmit by interval, e.g. of time, like in periodic transmissions. Examples are beacon transmissions or VOIP transmissions in reserved time slots. It is advantageous to advertise these periodic transmissions in an environment around the transmitter and the receiver of these transmissions so as to enhance robustness and/or to reduce competition for the spectrum.

In the current 802.11s draft standard (802.11s D1.05) there are two information elements for this purpose:

The first information element is the beacon timing element, as described in Section 7.3.2.65 in the IEEE 802.11s D1.05 specification. This information element advertises the times of the beacon transmission of the Mesh Point (MP) that transmits this element, as well as the beacon transmission times of its neighbours. This information element informs the stations in the neighbourhood of the beacon transmission times. Thus, stations can avoid transmitting during these times, e.g. by setting a NAV or by rescheduling their own beacons, and avoid collisions and contention.

The second information element is the MDAOP advertisements element. This information element advertises the time slots that have been reserved for an MDA (Mesh Deterministic Access) transmission. It lists both the reservations in which the MP that transmits this element is involved as either transmitter or receiver (the TX-RX Times report) and the reservations in which one of its neighbours is involved as a transmitter or as a receiver (Interfering Times report). The effectiveness of such measures has been reported in various publications, such as "IEEE 802.11s mesh deterministic access" by Hiertz, Max, Junge, Denteneer, and Berlemann submitted to MilCom07.

These first and second information elements are thus built for reporting to the neighbours the airtime that the MP is intended to reserve.

To this purpose, the first and second elements are embedded in a message, so-called a beacon frame, as described in Section 7.2.3.1 in the IEEE 802.11s D1.05 specification.

Although the above mechanisms enhance communication robustness over the medium and prevent conflicts between MPs, the beacon frames can nevertheless take a large amount of bandwidth, especially for dense mesh networks that require more bandwith dedicated to the report of reservations and thus larger beacon frames, and create what is commonly known as "Beacon bloat" (beacons with a very large size that take too much bandwidth).

SUMMARY OF THE INVENTION

It is an object of the invention to decrease the risks of overloading a network.

In a first embodiment, the invention proposes, in a network in which stations transmit by intervals, a method of generating a message by a station for reporting to other stations of reservations of a medium in an interval, wherein the station:
  generates a set of reservation information elements wherein each reservation information element identifies one of said reservations in the interval; and
  creates a plurality of messages containing reservation information elements so as to distribute the reservation information elements of the said set of information elements into the plurality of messages.

By implementing such a distribution of the reservation information over various messages, it is not necessary to include all the reservation information elements in a single message. Accordingly, the frequency with which a reservation information element is found in the network can be reduced and the information rate can therefore be reduced in the network.

It is a second embodiment of the invention to propose, in a network in which stations transmit by intervals, a method of generating message by a station for reporting to other stations of reservations of a medium in an interval, wherein the station:
  generates reservation information elements, each reservation information element comprising information for identifying a current reservation; and
  creates a message containing solely the reservation information elements, among the said set of reservation information elements, which are relative to the current reservations that have been changed since previous reservations.

In particular, an information contained in each one of said reservation information elements may be the result of a difference between a reservation information identifying the current reservation and a reservation information identifying a previous reservation, or reversely, such that these informations identifying the changements occurred between the previous and the current reservations As a consequence, the method according to the first or the second embodiment generates messages of small size since they do not necessarily contain all the reservation information elements (for the first embodiment) or contain only informations relative to the reservation changements that have been occurred since the previous reservations (for the second embodiment).

This avoids a severe form of message bloat which would include all the reservation informations.

This also can avoid generating very large messages.

By reducing the message size, the amount of data that is transmitted is reduced, then the transmission duration decreases, and thereby the wireless medium is less busy.

Accordingly, a message generated according to the invention can be transmitted at high speeds without switching to another Modulation and Coding Scheme (MCS)—the latter being used for increasing the transmission speed on the PHY layer for the beacon frame transmission. The most robust MCS will be preferably chosen for the transmission of the message in order to ensure the message can be received also at far distances.

The present invention also relates to a method of transmitting message by a station into a network, in order to inform other stations of the reservation of a medium in an interval, comprising the following steps implemented by a station:

generating message according to the method of the first or second embodiment;

transmitting the message to other MPs.

The present invention also relates to an electronic device dedicated to be a station in a network, comprising means for transmitting data by intervals and means for implementing the method according to the first or second embodiment.

The present invention also relates to a network comprising a plurality of these electronic devices.

The present invention also relates to a computer program comprising means for implementing the method of the first or second embodiment.

The present invention also relates to a signal forming a message containing reservation information elements and generated by the method of the first or second embodiment.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The particular embodiments hereafter described for illustrating the invention, relate to reservations of a medium by mesh points in a mesh wireless network in which the mesh points transmit at intervals of time, e.g. regularly or periodically. Examples that will be hereafter described are beacon transmissions or VOIP transmissions in reserved time slots. However the invention can also be applied in frequency and/or code and/or other dimension.

The invention relates more particularly to the generating of message (so-called beacon) by a mesh point (MP) of the mesh network, for informing other MPs of the network of reservations of a medium in an interval.

To this purpose the MP:

generates a set of reservation information elements;

creates at least one message (so-called beacon frame) containing at least a part of the reservation information elements;

transmits the message(s) to other MPs, and especially to neighbours.

A reservation information element may be any kind of element whose coded structure is arranged for ordering and containing informations relative to one reservation of the medium so as to identify a reservation in the considered interval.

The transmission of informations performed by the MP may be triggered under a specific request sent by one or several other MPs.

MPs are thus informed of what reservations have been done by neighbours in the considered interval of time.

These MPs may therefore provide their own reservations, taking account of the reservation informations contained in the reservation information elements.

According to a first exemplary embodiment, the invention proposes the generating of messages (so-called beacon frames) by a MP comprising the following steps:

(a) generating of a set of reservation information elements wherein each reservation information element defines one of said reservations in the interval; and (b) creation of a plurality of messages containing reservation information elements so as to distribute the reservation information elements of the said set of information elements into the plurality of messages.

In the example of using a mesh network complying with the current 802.11s draft standard (802.11s D1.05), the interval of time is called Mesh DTIM (Mail Delivery traffic Indication Message) Interval.

Still in the example of using a mesh network complying with the current 802.11s draft standard (802.11s D1.05), the messages may be encoded so as to each comprise a structure similar as a Beacon Timing Element, as described in Section 7.3.2.65 incorporated herein by reference, and/or as a MDAOP Advertisement element, as described in Section 7.3.2.69 incorporated herein by reference.

Nevertheless, the message according to the invention does not comprise all the reservations over the entire DTIM, contrary to the Beacon Timing Element and the MDAOP Advertisement element of the drafted standard, since the reservations are distributed over several messages.

If a message comprises such a Beacon Timing Element, the informations for each Becon timing reservation is contained in a corresponding reservation information element called "Self Beacon Timing" subfield in the Section 7.3.2.65, which identifies the beacon time reserved by the considered MP—i.e. the MP that transmits the message. In particular, the coding of this reservation information element is illustrated in FIG. s29 of this Section. Still in the case of a message comprises a Beacon Timing Element, at least another reservation information element may correspond to the "Synchronized Beacon Timing MP1" subfield of the Section 7.3.2.65 which identifies a beacon time reserved by at least one neighbour of the considered MP as described in the Section 7.3.2.65. In particular, the coding of this reservation information element is illustrated in FIG. s30 of this Section.

If now a message comprises a MDAOP Advertisement element, the informations of each MDAOP-type reservation is contained in a corresponding reservation information element called "MDAOPk" (k being included in the range 1-n) subfield in the Section 7.3.2.69 and illustrated in FIG. s37 of this Section, each MDAOP identifying an airtime or slot in the DTIM reserved by the considered MP—i.e. the MP that transmits the message. The set-up of such a reservation information element is similar as those described Section 7.3.2.66 of the standard, incorporated herein by reference. Still in the case of a message comprises a MDAOP Advertisement Element, at least another reservation information element may correspond to "MDAOP" subfield comprised in the "Interfering times report", which identifies each an airtime or slot in the DTIM reserved at least to one neighbour of the considered MP, as described in the Section 7.3.2.69. The coding of this reservation information element is similar as those of the "MDAOP1" of the considered MP.

Both of these type reservation information elements feature a clever, but different encoding of the times at which the periodic reservations take place so as to reduce the size of the information elements. Also, the processing for the two types of information elements is different. In the beacon times element, the reporting MP reports its knowledge about its own beaconing time and of the beaconing times of neighbours. In the MDAOP advertisements, the reporting MP advertises the reservations in which is involved as a transmitter or receiver (the "TX-RX times"). Additionally, it may copy the TX-RX times of its neighbours in the "Interfering times" element of this information element, so as to avoid hidden node collisions.

The messages according to the exemplary first embodiment of the invention, may also be each encoded for combining the structure of a Beacon Timing Element, as described in Section 7.3.2.65, and of a MDAOP Advertisement element, as described in Section 7.3.2.69, into a single structure.

In particular, some of said "Self Beacon Timing" subfields may be combined to "MP1" subfields into single subfields according to encoding rules. In this case, the said "reservation information element" is the combination of these two subfields.

This message presents a number of advantages comparing with the first one (Beacon Timing Element alone) and the second one (MDAOP Advertisement element alone):

by combining the different, periodic, airtime reservations into one structure, the coding is more efficient. This can be explained as follows. The format in which the advertised reservations are presented need not to be identical to the format of the individual transmissions. E.g., if the device sends a beacon and then immediately thereafter a VOIP message in reserved slot, it can advertise these in a combined manner and efficiently, using one entry rather than using two entries;

the implementation of the device acting as a MP can be simplified. Indeed, now there is a need for only one routine to parse and interpret the information;

there is a mechanism in place to advertise and protect new periodic information, e.g. routing information or management information, without changing the basic functionality of the devices.

Figure 1:
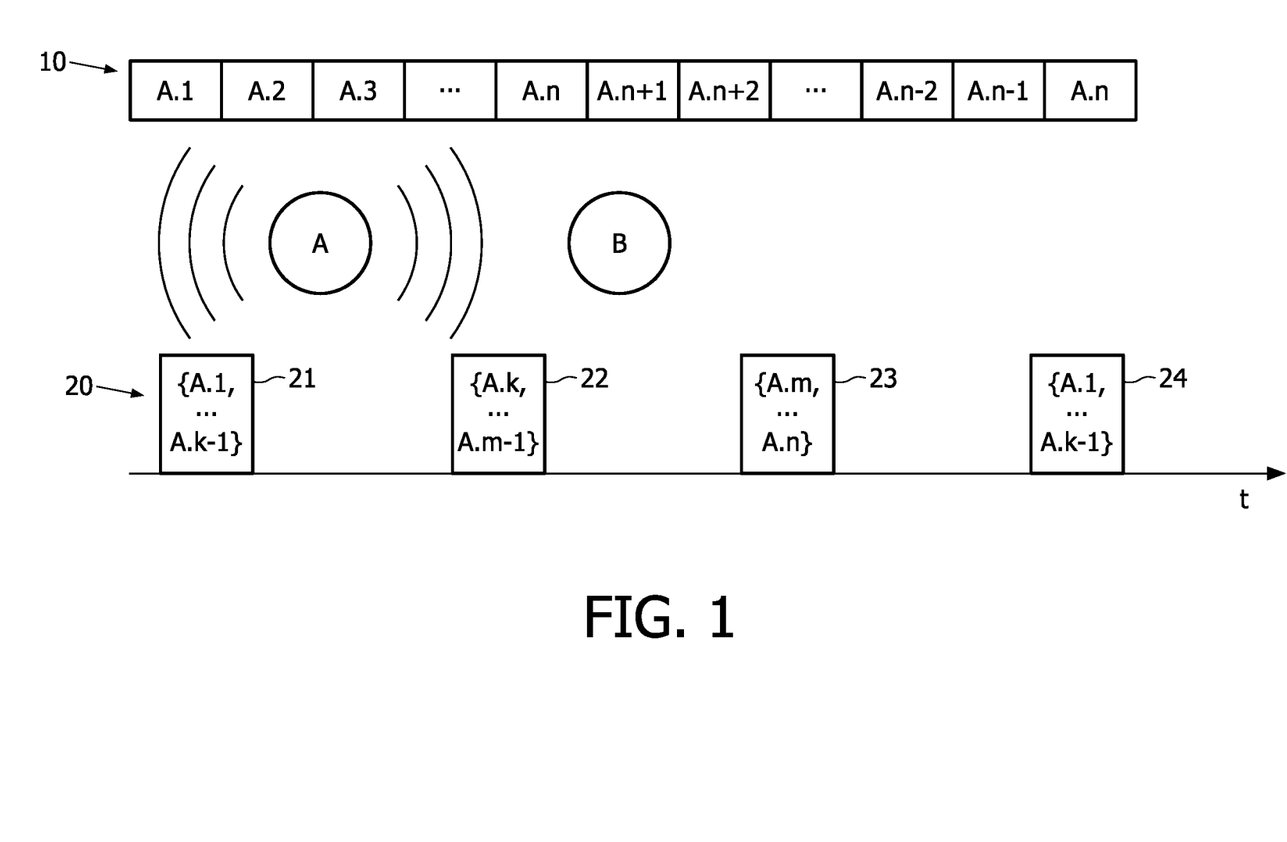
FIG. 1 shows schematically how a transmitter "A" generates and transmits to a receiver "B" some messages for reporting the latter of the reservations that "A" operated on the medium, according to a first embodiment of the invention.

The method of reservation according to said steps (a) and (b) proposes to distribute the reservation informations over various beacons, as it is shown in FIG. 1.

With reference to FIG. 1, a MP referenced as "A" wishes to reserve a set of slots (referenced 1, 2, . . . n). To this aim, MP "A" generates a set (10) of n reservation information elements (A.1, A.2, . . . , A.n) and periodically transmits them in broadcast messages (so-called beacon frames) referenced 20. Each message contains only a few of the reservation information elements—the first message 21 contains {A.1 . . . A.k−1} elements; the second message 22 contains {A.k . . . A.m−1} elements; the third message 23 contains {A.m+1 . . . A.n} elements; the fourth message 24 contains new {A.1 . . . A.k−1} elements. In this example, the reservation informations of the n slots in the considered interval of time are distributed over the three messages 21, 22, 23. The fourth message contains the first reservation information elements {A.1 . . . A.k−1} for the next interval.

With this static topology, it is unnecessary to repeat the each reservation element at a high rate, reducing thus the frequency with which the information is included in the beacons.

Furthermore, the messages are small, avoiding thus severe form of beacon bloat, and problems of low rates.

From the message reception point of view, should an MP need to know the whole set of reservation informations (1 . . . n) from one of its neighbours, it can request this directly via for example unicast, in which case the information can be transmitted at much higher speeds and/or "on demand".

In a particular implementation of the first exemplary embodiment of the invention, some of the reservation information elements may be rather static while others may change frequently.

Figure 2:
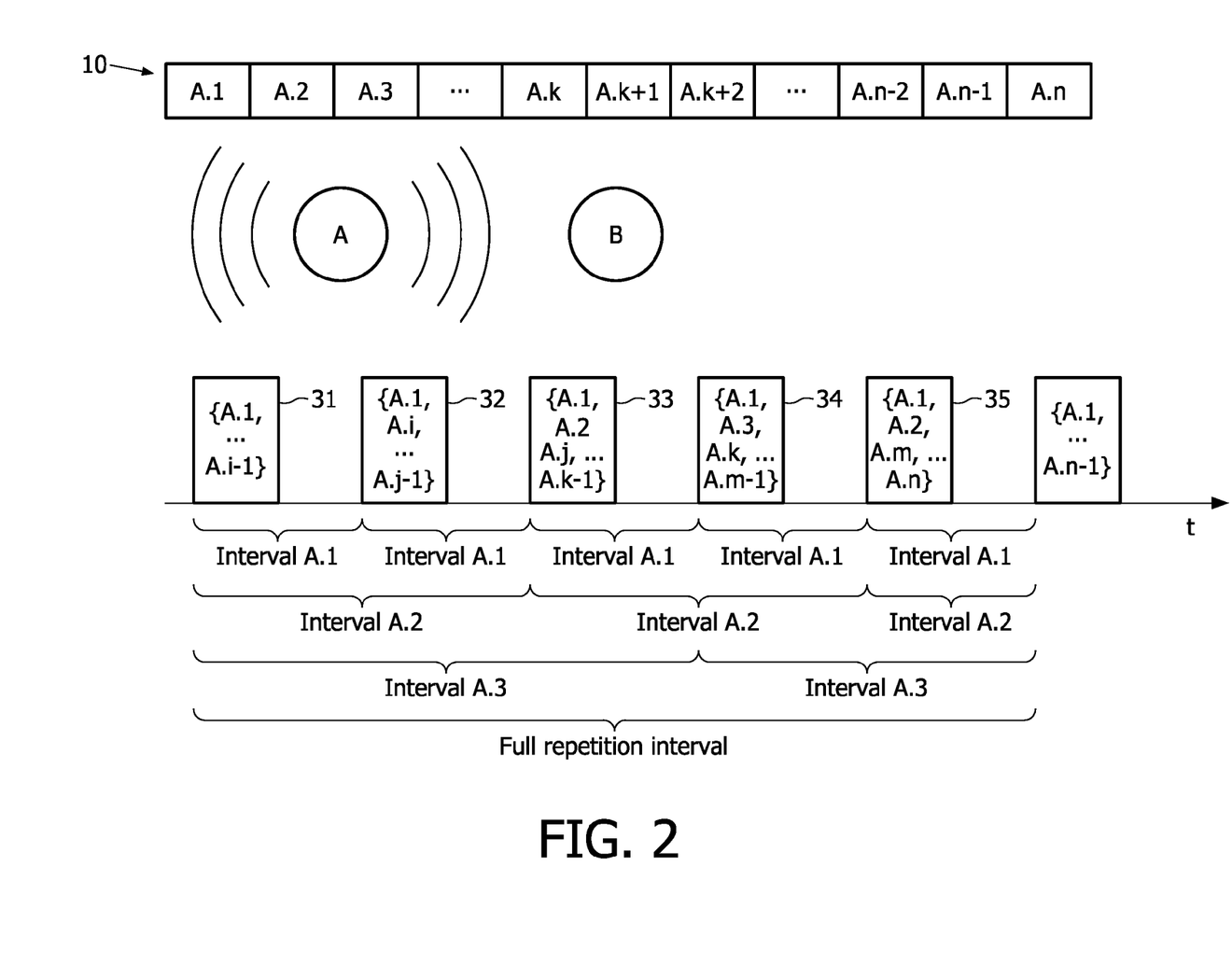
FIG. 2 shows schematically how a transmitter "A" generates and transmits to a receiver "B" some messages for reporting the latter of the reservations that "A" operated on the medium, according to a particular case of the first embodiment of the invention.

FIG. 2 illustrates this particular scenario where Mesh device A's reservation information elements are distributed over five broadcast messages (beacon frames) 31-35.

This distribution of the reservation elements into the plurality of messages 31-35 is implemented such that the reservation information elements A1, A2, A3 are contained in several messages among the said five messages: A.1 is repeated with every broadcast message (highest repetition interval), reservation information A.2 is sent in every second and reservation information A.3 in every third message.

Thus, the periodicity of the distribution of the reservation information elements over the messages assigned to the reservations in a particular interval can be adjusted. This adjustment may for example be chosen depending on determinate criteria, such as a urgency criteria, reservation element's importance, recent changes in the network topology or other needs.

In a second exemplary embodiment, the invention proposes the generating of message (so-called beacon) by a MP comprising the following steps:

generating of reservation information elements, each reservation information element comprising information for identifying a current reservation, reservation information elements being generated only for the current reservations that have been changed since previous reservations; and creation of a message containing at least a part of the said reservation information elements.

In this particular second embodiment, a "current reservation" may refer to the reservation of an airtime or a slot in the current interval, and a "previous reservation" may refer to the reservation of an airtime or a slot in a previous interval. Alternatively, a "current reservation" may refer to the reservation reported in the current message, and a "previous reservation" may refer to the reservation reported in a previous message. In this particular case, several messages may all report reservation informations for the current interval, informing other MPs of reservation changes for the current interval since a previous reported message relative to this current interval.

The reservation information elements may contain differential reservation informations between the informations of the current reservation and the informations of the previous one, so as to clearly identify the changement between the previous reservation and the current one. The difference between reservation informations may be implemented between reservation informations of Beacon-types as described in Section 7.3.2.65 of the current 802.11s draft standard (802.11s D1.05), or of MDAOP-types as described in Section 7.3.2.69 of the current 802.11s draft standard (802.11s D1.05), or of a combination thereof. In other cases, each difference of reservation informations may be implemented between reservation informations structured in another format. Another format may for example be obtained from the combination of reservation informations of Beacon-type with reservation informations of MDAOP-type into single reservation informations according to specific encoding rules.

In an alternative case, the reservation information elements may not contain differential reservation informations, but entire reservation informations of the current reservations. The entire reservation informations may be of Beacon-types as described in Section 7.3.2.65 of the current 802.11s draft standard (802.11s D1.05), or of MDAOP-types as described in Section 7.3.2.69 of the current 802.11s draft standard (802.11s D1.05), or of a combination thereof. In other cases, the reservation informations are structured in another format. Another format may for example be obtained from the combination of reservation informations of Beacon-types with reservation informations of MDAOP-types into single reservation informations according to encoding rules.

Informations of Beacon-types are contained in a corresponding reservation information element called "Self Beacon Timing" subfield in the Section 7.3.2.65, which identifies the beacon time reserved by the considered MP—i.e. the MP that transmits the message. In particular, the coding of this reservation information element is illustrated in FIG. s29 of this Section. Still in the case of a message comprises a Beacon Timing Element, at least another reservation information of Beacon-types may be contained in a corresponding reservation information element called "Synchronized Beacon Timing MP1" subfield in the Section 7.3.2.65, which identifies a beacon time reserved by at least one neighbour of the considered MP. In particular, the coding of this reservation information element is illustrated in FIG. s30 of this Section.

If now a message comprises a MDAOP Advertisement element, the informations for each reservations of MDAOP-type is contained in a reservation information element called "MDAOPk" (k being in the range 1-n) subfield in the Section 7.3.2.69 and illustrated in FIG. s37 of this Section, each MDAOP identifying an airtime or slot in the DTIM reserved by the considered MP—i.e. the MP that transmits the message. The set-up of such a reservation information element is similar as those described Section 7.3.2.66 of the standard, incorporated herein by reference. Still in the case of a message comprises a MDAOP Advertisement Element, at least another reservation information element may correspond to "MDAOP" subfield comprised in the "Interfering times report" of the Section 7.3.2.69, which identifies each an airtime or slot in the DTIM reserved at least to one neighbour of the considered MP, as described in the Section 7.3.2.69. The coding of this reservation information element is similar as those of the "MDAOP1" of the considered MP.

Mesh other MPs learn about their neighbour reservations via direct frame exchange.

The fact that messages (beacon frames) hold only information on the changed elements allows for quick announcements of reservation changes. Thus, long term reservations do not need to be broadcasted and do not add to the overhead.

Figure 3:
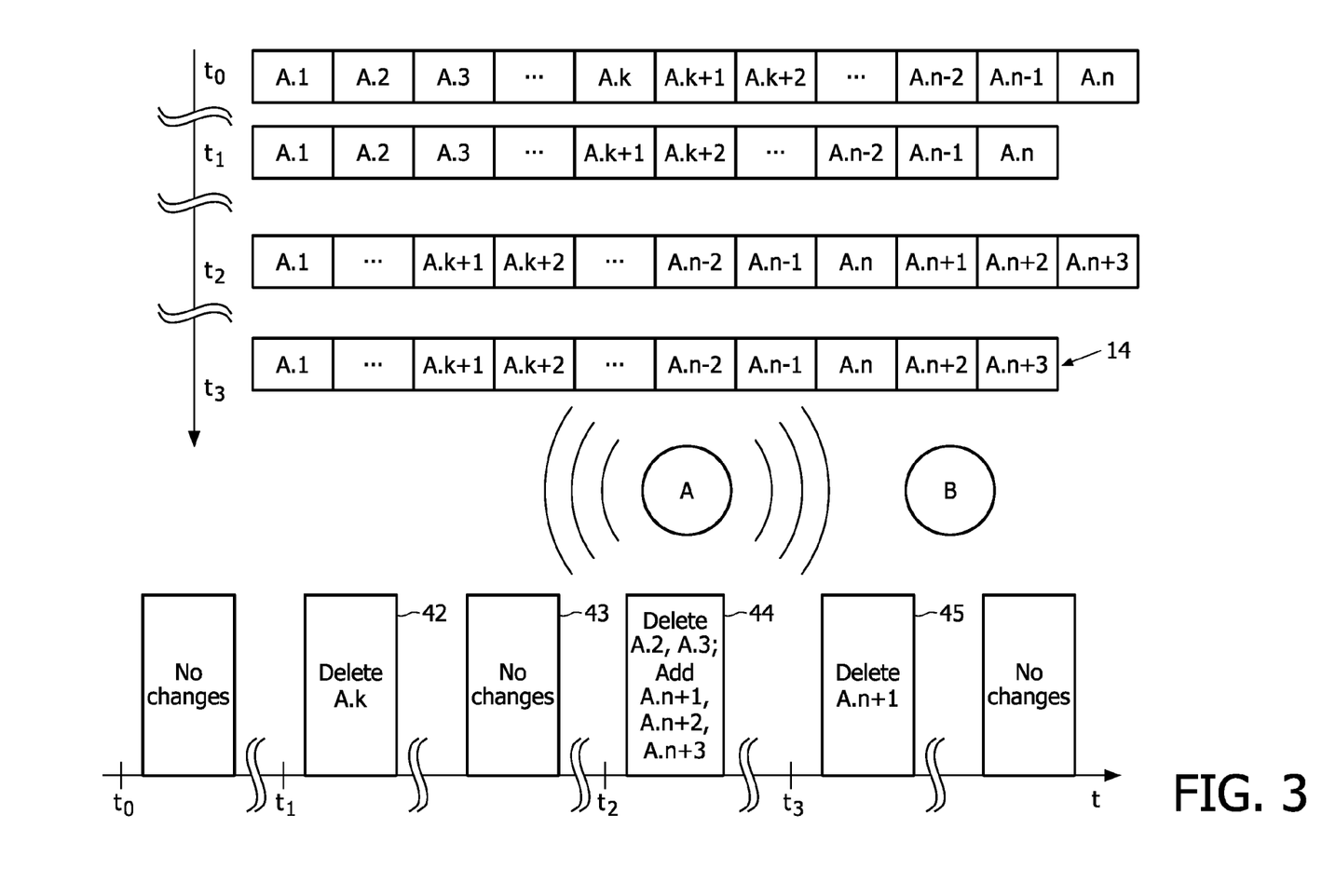
FIG. 3 shows schematically how a transmitter "A" generates and transmits to a receiver "B" some messages for reporting the latter of the reservations that "A" operated on the medium, according to a second embodiment of the invention.

FIG. 3 illustrates this second embodiment. At $t_0$, $t_1$, $t_2$, $t_3$, respective sets of identified slots 11, 12, 13, 14 have to be reserved.

At $t_0$, the broadcast message (beacon frame) has n reservations. Mesh devices surrounding device A, have learned from previous message exchanges about the current n reservations. At $t_1$, reservation k becomes invalid. At the immediately following scheduled broadcast message (beacon frame) 42, device A solely announces the deletion of reservation k. At $t_2$, the reservations A.2 and A.3 expire, new reservations A.n+1, A.n+2 and A.n+3 are added and the other reservations remain unchanged. Thus, the following beacon frame 44 solely announces the newly set-up reservation elements A.n+1, A.n+2 and A.n+3 and the expiration of elements A.2 and A.3. At $t_3$, Airtime reservation A.n+1 outdates. The subsequent message 45 informs then of its expiration.

FIGS. 4-10 shows one possible way to code the reservation information in the messages according to the second embodiment. The coding is a differential one, for communicating only the differences.

Figure 4:
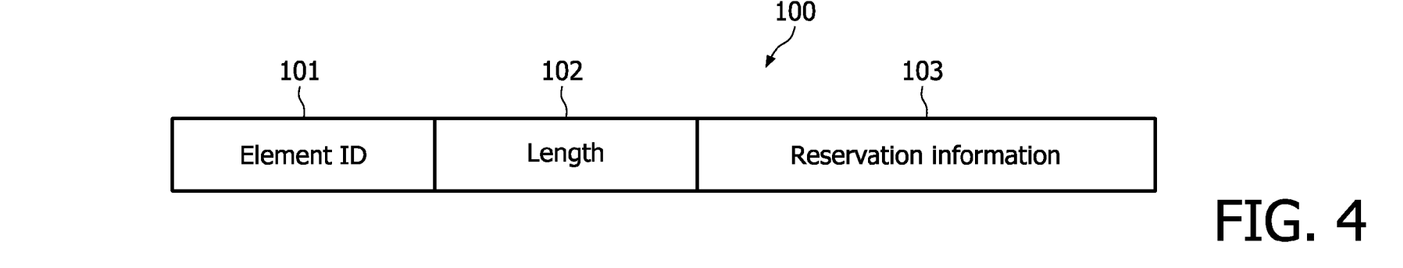
FIG. 4 shows an example of the structure of a message according to the second embodiment of the invention.

FIG. 4 shows a message (100) which contains in (101) the interval or sub-interval identifier or message identifier (Id). To enable neighbored MPs to check whether their information is up to date, the element also contains (in 102) the total reserved time.

Figure 5:
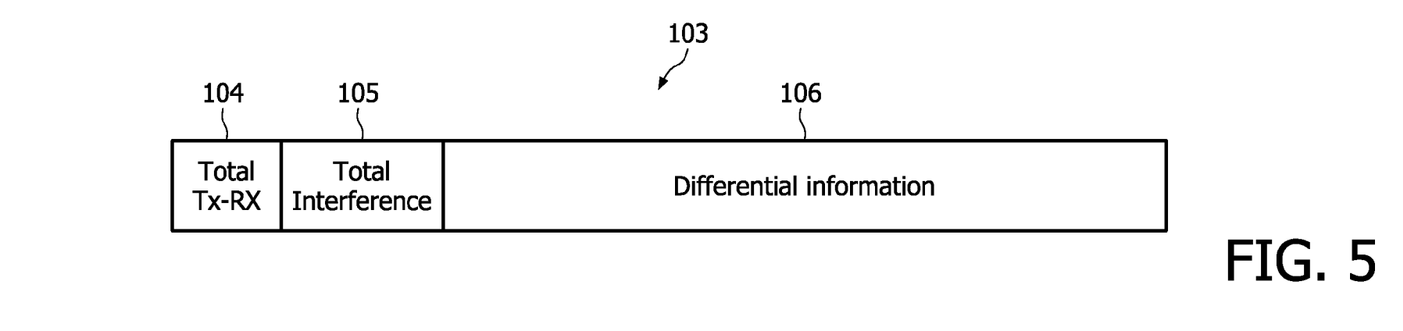
FIG. 5-10 show details of the message of FIG. 4.

The cell (103) entitled "Reservation Information" of FIG. 4 is detailed on FIG. 5: it contains the total number of time reserved for Tx-Rx operations in which the MP itself is engaged, in (104), i.e. the total number of time for the reservations that have been changed since last report. The cell (103) also contains the total interference time (105) in which the reporter's first neighbours have reserved. The total Tx-Rx and the total Interference (105) are both non-negative numbers.

Figure 6:
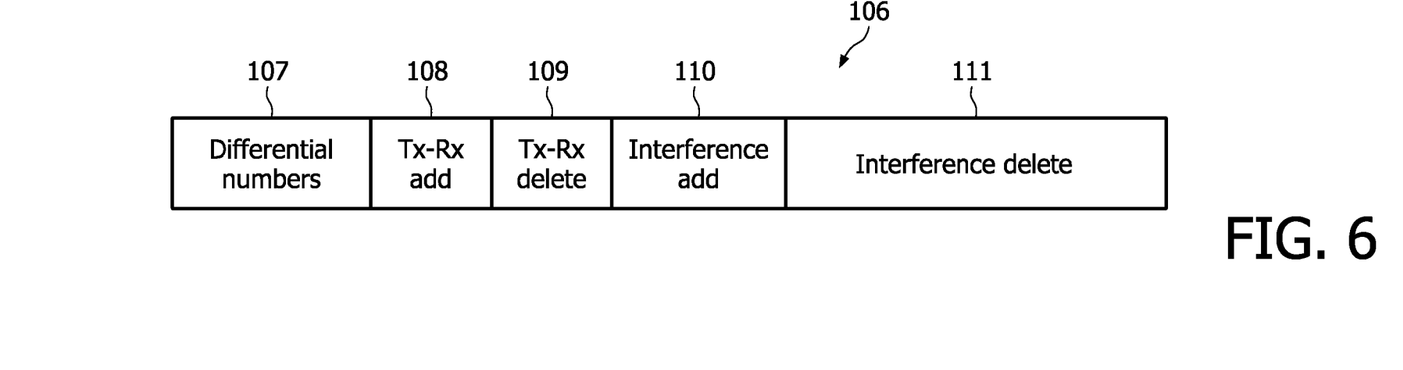

The "Differential Information" cell (106) of FIG. 5 is detailed in FIG. 6: it contains the information as it has changed since the last report. This information is split according to Tx-Rx (108-109) and to Interference informations (110-111).

Figure 7:
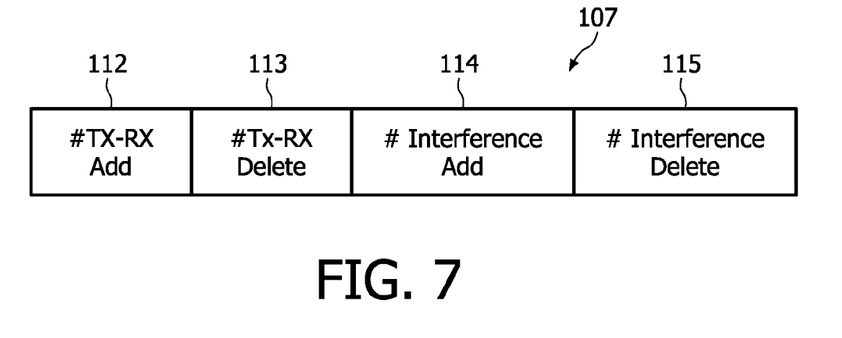

The differential numbers element (107) of FIG. 6 is detailed in FIG. 7, and contains the number of reservations added for TX-RX in (112) and for Interference times (114) and the number of reservations deleted for TX-RX in (113) and for Interference times (115). Note that for each of these quantities (112-115) just two bits are sufficient. These are interpreted as non-negative numbers, limiting the number of changes to four.

If more changes need to be reported, then this may be done in sending successive messages.

Figure 8:
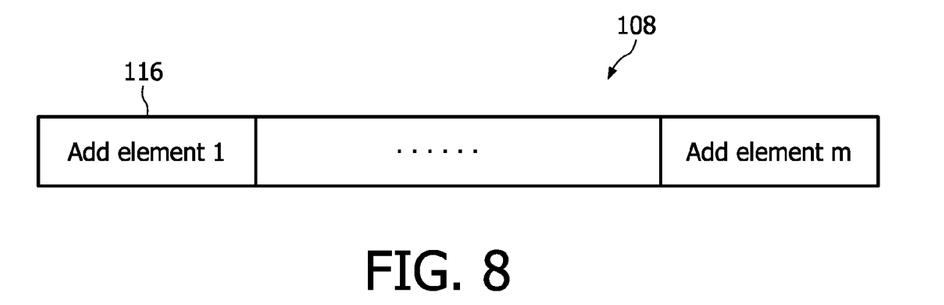

The Tx-Rx add element (108) of FIG. 6 is detailed on FIG. 8. It reports the number m of added Tx-RX reservations in which the MP is involved, by "Add elements" (116). A "Add element" is a "Reservation information element", as discussed previously, that allows to identify an individual reservation.

It is to be noticed that, as the "Interference adds" (110) are similar as the "Add elements", they will not be detailed here.

Figure 9:
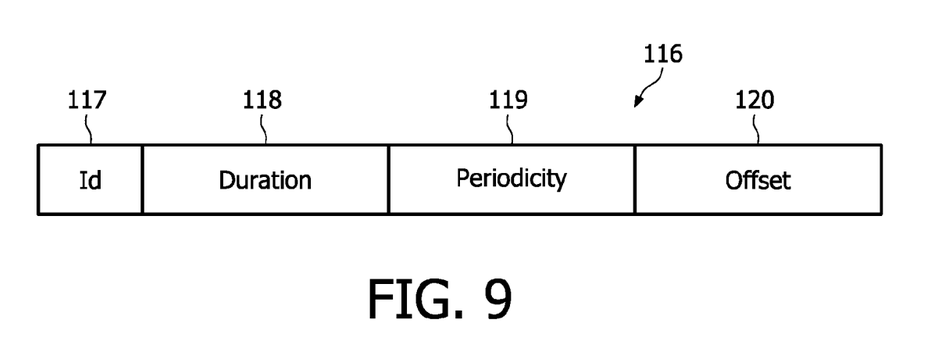

Each individual "Add element" (116) is detailed in FIG. 9. The model of this Add element is similar as those of a MDAOP element as described in the current 802.11s draft standard (802.11s D1.05)—Section 7.3.2.66. Thus, "Id" (117) identifies the slot reservation, "Duration" (118) specifies the duration of the reserved slot, "Periodicity" (119) gives the number of subintervals (in which the said interval is divided), and "Offset" (120) specifies the position of the reserved slot in the subinterval and interval. Note that this "Add element" contains an "Id" (117), which is unique in combination with the MAC address of either the transmitter or the receiver. Note that in setting up a reservation, there is no problem in guaranteeing uniqueness, as only the transmitter and receiver are involved.

Figure 10:
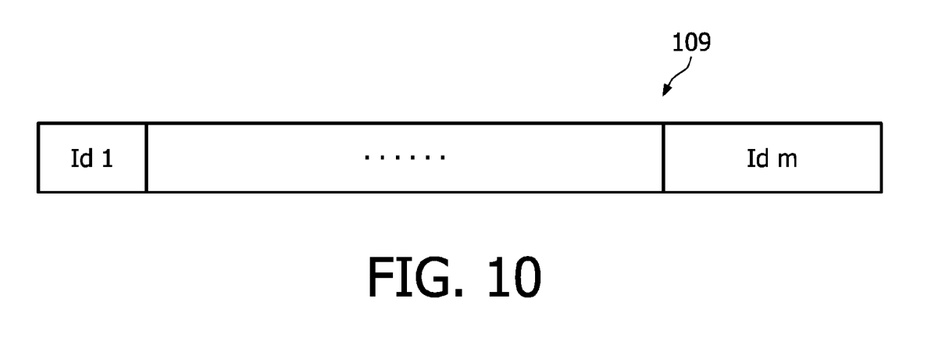

Now turning to the Delete cell (109) of FIG. 6 and detailed in FIG. 10, this cell (109) contains a list of Ids of the reservations that are no longer needed because MP has decided to delete them.

It is to be noticed that the present invention is not limited to a mesh network or to a wireless network but can be extended to any network whose stations are able to communicate to each other by intervals.

The invention claimed is:

1. A method, in a network including stations that transmit in intervals, of generating a message by a station for reporting to other stations about reservations of a medium in an interval, the method comprising:
    generating reservation information elements for the interval, wherein each reservation information element identifies one of the reservations in the interval; and
    creating a plurality of messages, each one of the plurality of messages containing a subset of the reservation information elements generated for the interval in order to distribute all of the reservation information elements over the plurality of messages, wherein a message of the plurality of messages includes only reservation information elements relevant to current reservations that changed since previous reservations.

2. The method according to claim 1, wherein the network is a wireless mesh network according to IEEE 802.11s standard, and the station is a mesh point.

3. The method according to claim 1, further comprising distributing at least one of the reservation information elements in more than one message in the plurality of messages.

4. The method according to claim 3, wherein the at least one of the reservation information elements contained in more than one message is repeated in some of the plurality of messages according to a predetermined repetition rate.

5. The method according to claim 1, wherein an information contained in each one of the reservation information elements is a difference between a first reservation information identifying the current reservation and a second reservation information identifying a previous reservation.

6. The method according to claim 1, wherein the reservation information elements are ordered in the message according to a change between the current and previous reservations.

7. The method according to claim 1, wherein the reservation information elements identify reservations done by neighbouring stations.

8. The method according to claim 1, wherein the message is a beacon frame.

9. The method according to claim 1, further comprising transmitting the message to other stations.

10. A station for generating a message in a network to indicate a reservation of a medium, comprising:
    a transmitter for transmitting data in intervals; and
    a processing unit for generating reservation information elements for an interval, wherein each reservation information element identifies one of the reservations in the interval, the processing unit creating a plurality of messages, each one of the plurality of messages containing a subset of the reservation information elements generated for the interval in order to distribute all of the reservation information elements over the plurality of messages, wherein a message of the plurality of messages includes only reservation information elements relevant to current reservations that changed since previous reservations.

11. A non-transitory computer-readable storage medium having stored executable instructions for generating a message in a network to indicate a reservation of a medium, when executed, the acts comprising:
    transmitting data in intervals;
    generating reservation information elements for an interval, wherein each reservation information element identifies one of the reservations in the interval; and
    creating a plurality of messages, each one of the plurality of messages containing a subset of the reservation information elements generated for the interval in order to distribute all of the reservation information elements over the plurality of messages, wherein a message of the plurality of messages includes only reservation information elements relevant to current reservations that changed since previous reservations.

* * * * *